US011650100B2

(12) United States Patent
Zhen et al.

(10) Patent No.: US 11,650,100 B2
(45) Date of Patent: May 16, 2023

(54) SYSTEM AND METHOD FOR TESTING A SPECTRAL RESPONSE SPEED OF A TUNABLE FILTER

(71) Applicant: SHENZHEN HYPERNANO OPTICS TECHNOLOGY CO., LTD., Shenzhen (CN)

(72) Inventors: Mingliang Zhen, Shenzhen (CN); Pingping Yu, Shenzhen (CN); Bin Guo, Shenzhen (CN); Jinbiao Huang, Shenzhen (CN)

(73) Assignee: SHENZHEN HYPERNANO OPTICS TECHNOLOGY CO., LTD., Shenzhen (CN)

( * ) Notice: Subject to any disclaimer, the term of this patent is extended or adjusted under 35 U.S.C. 154(b) by 18 days.

(21) Appl. No.: 17/425,644

(22) PCT Filed: Jul. 9, 2020

(86) PCT No.: PCT/CN2020/101055
§ 371 (c)(1),
(2) Date: Jul. 23, 2021

(87) PCT Pub. No.: WO2022/006811
PCT Pub. Date: Jan. 13, 2022

(65) Prior Publication Data
US 2022/0187127 A1 Jun. 16, 2022

(51) Int. Cl.
*G01J 3/28* (2006.01)
*G01J 3/02* (2006.01)
(Continued)

(52) U.S. Cl.
CPC .......... *G01J 3/2823* (2013.01); *G01J 3/0208* (2013.01); *G01J 3/14* (2013.01); *G01J 3/18* (2013.01);
(Continued)

(58) Field of Classification Search
CPC .......... G01J 3/2823; G01J 3/0208; G01J 3/12; G01J 3/14; G01J 3/18; G01J 3/0227;
(Continued)

(56) References Cited

U.S. PATENT DOCUMENTS 5,321,539 A 6/1994 Hirabayashi et al.
2019/0041329 A1* 2/2019 Hill ...................... G02B 27/286

FOREIGN PATENT DOCUMENTS

CN 1799001 A 7/2006
CN 101688808 A 3/2010
(Continued)

OTHER PUBLICATIONS

Vila-Francés, Joan, et al. "Analysis of acousto-optic tunable filter performance for imaging applications." Optical Engineering 49.11 (2010): 113203 (Year: 2010).*

(Continued)

*Primary Examiner* — Tarifur R Chowdhury
*Assistant Examiner* — Carlos Perez-Guzman
(74) *Attorney, Agent, or Firm* — Calfee Halter & Griswold LLP

(57) ABSTRACT

A system for testing a spectral response speed of a tunable filter is disclosed, which includes a collimating light source, a beam splitting element, a focusing lens, and an image recording device of light spot position arranged successively. The tunable filter is disposed between the collimating light source and the beam splitting element and configured to be continuously tuned within a certain wavelength range during testing. The beam splitting element is used to form light beams of different wavelength bands passing through the tunable filter into diffracted beams or refracted beams corresponding to different wavelength bands. The focusing lens is used to perform focusing. The image recording device of light spot position is used to record change (Continued)

information about positions where the diffracted beams or refracted beams corresponding to different wavelength bands are imaged.

5 Claims, 4 Drawing Sheets

(51) Int. Cl.
  *G01J 3/14* (2006.01)
  *G01J 3/18* (2006.01)
  *G02B 27/10* (2006.01)
(52) U.S. Cl.
  CPC .. *G02B 27/1086* (2013.01); *G01J 2003/2826* (2013.01)
(58) Field of Classification Search
  CPC ...... G01J 2003/2826; G01J 2003/1213; G02B 27/1086; G01M 11/0257; G01M 11/00; G01M 11/0207; G01M 11/0228
  See application file for complete search history.

(56) References Cited

FOREIGN PATENT DOCUMENTS

| CN | 102494873 A | 6/2012 |
| CN | 108919478 A | 11/2018 |
| CN | 109196333 A | 1/2019 |
| CN | 209624935 U | 11/2019 |

OTHER PUBLICATIONS

Fallet, Clément. "Angle resolved Mueller Polarimetry and applications to periodic structures". Diss. Ecole Polytechnique X, 2011 (Year: 2011).*
English Translation from PCT/CN2020/101055 dated Mar. 25, 2021 (3 pages).

* cited by examiner

SYSTEM AND METHOD FOR TESTING A SPECTRAL RESPONSE SPEED OF A TUNABLE FILTER

CROSS REFERENCE TO RELATED APPLICATIONS

This application is a national application of PCT/CN2020/101055, filed on Jul. 9, 2020. The contents of PCT/CN2020/101055 are all hereby incorporated by reference.

FIELD

The present application relates to the field of spectrum testing technologies, particularly to system and method for testing a spectral response speed of a tunable filter.

BACKGROUND

The change speed of the output wavelength of a tunable filter reaches the microsecond level. For visible light to infrared light wavelength bands, the wavelength desired to be output can be arbitrarily selected as needed, and the output wavelength has good monochromaticity and the full-width-half-maximum (FWHM) value is less than 10 nm. Since there is a time difference between outputs of different wavelengths, special testing is required to determine the total response time of a certain wavelength range. At present, a spectrometer is often used for testing rapidly changing portions of wavelength, and the temporal precision can just reach the millisecond level. Therefore, for a filter element with a higher-speed wavelength output change, there is a need for a testing method with higher temporal precision.

SUMMARY

In order to solve the technical problem that a high-speed wavelength output changing filter element in the prior art needs to perform high-precision time testing of the wavelength output change, the present application proposes a system and method for testing a spectral response speed of a tunable filter, which solves the technical problem that a high-speed wavelength output changing filter element in the prior art needs to perform high-precision time testing of the wavelength output change.

According to an aspect of the present application, there is provided a system for testing a spectral response speed of a tunable filter, comprising: a collimating light source, a beam splitting element, a focusing lens and an image recording device of light spot position arranged successively, the tunable filter being disposed between the collimating light source and the beam splitting element and configured to be continuously tuned within a certain wavelength range during testing, the beam splitting element being used to transform light beams of different wavelength bands passing through the tunable filter into diffracted beams or refracted beams corresponding to different wavelength bands, the focusing lens being used to focus the diffracted beams or refracted beams to be incident on the image recording device of light spot position, and the image recording device of light spot position being used to record change information about positions where the diffracted beams or refracted beams corresponding to different wavelength bands are imaged.

Further, the collimating light source comprises a light emitting source, a slit and a collimating lens arranged successively.

Further, the beam splitting element employs a diffraction grating or a refractive prism.

Further, the light spot image recording device employs a high-speed camera or a rolling shutter camera.

A method for testing a spectral response speed of a tunable filter which uses the above system comprises the following steps:

S1: irradiating the tunable filter with light from the collimating light source;

S2: continuously tuning the tunable filter within a certain wavelength range;

S3: record a displacement distance of a light spot position in the image recording device during the continuous tuning process; and S4: obtaining a response speed of the tunable filter based on time required for the displacement distance.

Further, in the case that the light spot image recording device comprises a high-speed camera, step S4 specifically comprises: recording a light spot position image corresponding to a light spot position P1 as a F1-th frame, and a light spot position image corresponding to a light spot position P2 as a F2-th frame, thus response time from a wavelength $\lambda 1$ to a wavelength $\lambda 2$ is $\Delta t=(F2-F1)/M$, where M is a frame rate of the image recording device of light spot position.

Further, in the case that the image recording device of light spot position comprises a rolling shutter camera, step S4 specifically comprises: firstly establishing a coordinate system in which an abscissa represents a wavelength, and a ordinate represents time; locating information of the light spot positions P1 and P2 within the coordinate system according to a vision algorithm, then calculating response time $\Delta t$ from a wavelength $\lambda 1$ to a wavelength $\lambda 2$.

The present application mainly employs the following principle: different light beams have different diffraction angles or refraction angles after passing through a light splitting element, and thus have light spot position distributions of corresponding wavelengths at the spatial receiving end, so that change information in a spectral dimension is converted into that in a spatial dimension. By a conversion from the spectral dimension to the spatial dimension, the high-speed spectral output of the tunable filter will cause the light spot to move at a high speed, and the camera will record time required for the light spot to move from the initial position to the ending position, thereby obtaining the wavelength response speed of the tunable filter.

BRIEF DESCRIPTION OF THE DRAWINGS

The drawings are included to provide a further understanding of embodiments, and the drawings are incorporated into this specification and constitute a part of this specification. The drawings illustrate embodiments and together with the description serve to explain the principles of the present application. It will be easy to recognize other embodiments and many expected advantages of the embodiments because they become better understood by referring to the following detailed description. The elements in the drawings are not necessarily in proportion to each other. The same reference numerals refer to corresponding similar components.

DETAILED DESCRIPTION

In the detailed description below, reference is made to the accompanying drawings, which form a part of the detailed description and are shown through illustrative specific embodiments in which the present application can be practiced. In this regard, directional terms such as "top", "bottom", "left", "right", "upper", "lower", etc. are used with reference to the orientation of a described figure. Because the components of an embodiment can be positioned in several different orientations, directional terms are used for illustration purposes and directional terms are by no means limiting. It should be understood that other embodiments may be utilized or logical changes may be made without departing from the scope of the present application. Therefore, the detailed description below should not be used in a limiting sense, and the scope of the present application is defined by the appended claims.

Figure 1:
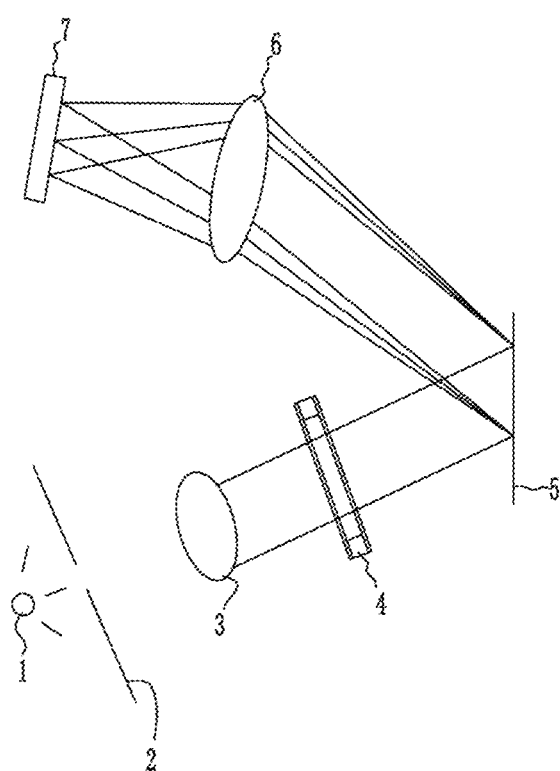
FIG. 1 is a schematic view of an optical path according to an embodiment of the present application.

FIG. 1 is a schematic view of an optical path according to an embodiment of the present application.

As shown in FIG. 1, a system for testing a spectral response speed of a tunable filter comprises a collimating light source, a beam splitting element 5, a focusing lens 6, and an image recording device of light spot position 7. A tunable filter 4 to be tested is disposed between the collimating light source and the beam splitting element 5. The collimating light source illuminates the tunable filter 4. The tunable filter 4 is continuously tuned in a certain wavelength range. A light beam transmitted by the tunable filter 4 is incident on the beam splitting element 5 to generate a diffracted light beam or a refracted light beam of a corresponding wavelength band, and then passes through the focusing lens 6 to form an image in the form of a light spot at the image recording device of light spot position 7.

In a specific embodiment, time information and spot position movement information within a certain wavelength changing range is recorded by the image recording device of light spot position 7, and the response speed of the tunable filter is obtained based on the time information and spot position movement information.

By utilizing the principle of the beam splitting element 5 that light of different wavelengths has different diffraction or refraction angles through the beam splitting element, the tunable filter 4 tunes light of different wavelengths to form different spot position distributions, and the high-speed spectral output of the tunable filter also causes the light spot to move at a high speed. The image recording device of light spot position 7 records time required for the light spot to move from the initial position to the ending position, so as to obtain the spectral response speed of the tunable filter.

In a specific embodiment, the image recording device of light spot employs a high-speed camera or a rolling shutter camera. The frame rate of the high-speed camera can reach thousands of frames, tens of thousands of frames or even hundreds of thousands of frames per second, which can greatly improve the temporal precision. The 1080P 30-frame rolling shutter camera has a progressive exposure time difference of 30 us, which can also greatly improve the temporal precision.

In a specific embodiment, the collimating light source includes a light source 1, a slit 2 and a collimating lens 3. After the light of the light source 1 passes through the slit 2 and the collimating lens 3, a parallel beam is formed to illuminate the tunable filter 4 so as to ensure the intensity of the light source incident on the tunable filter and the stability of the light source.

In a specific embodiment, the beam splitting element 5 employs a diffraction grating, and light beams of different wavelength bands passing through the tunable filter 4 pass through the diffraction grating to generate diffracted light beams of corresponding wavelength bands, and then irradiate the spot position imaging and recording device 7 through the focusing lens 6. The image recording device of spot position 7 receives the light beams to make them imaged in the form of light spots and records the position image information of the spot movement for the tunable filter 4 in different wavelength bands.

The choice of the beam splitting element 5 is not so limited. The beam splitting element 5 plays the role of splitting light, and may be a diffractive optical element such as a grating, or a refractive geometric optical element such as a prism. The grating may also be a reflective or transmissive, ordinary grating or blazed grating, and can be chosen as needed.

Figure 2:
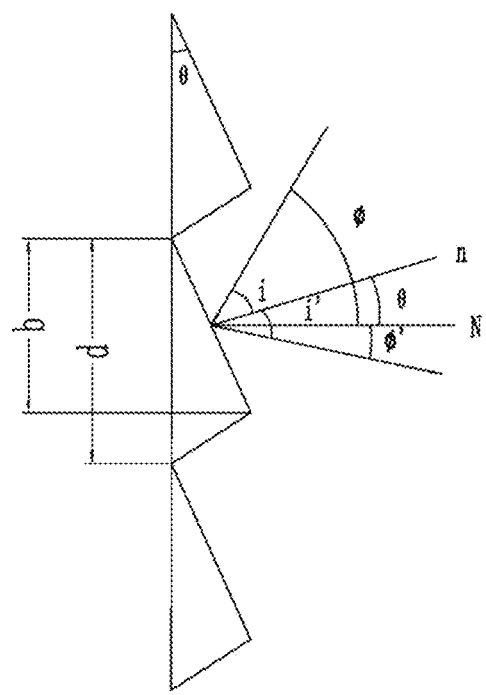
FIG. 2 is a schematic view of a grating structure according to a specific embodiment of the present application.

In a specific embodiment, the beam splitting element 5 employs a reflective blazed grating, as shown in FIG. 2. The collimating light source is incident at a blazed angle, and the focusing lens 6 focuses diffracted rays of different wavelength bands on the image recording device of light spot position 7 in the blazed direction. The blazed angle of the reflective blazed grating is θ, the grating constant is d, n is the normal direction of the grating slope, N is the normal direction of the grating surface, φ and φ' are the incident angle and reflection angle with respect to the normal of the grating surface, and i and i' are the incident angle and reflection angle with respect to the normal of the grating slope. The distribution intensity I of the diffraction slits of the blazed grating is specifically:

$$I = I_0 \frac{\sin^2\alpha}{\alpha^2} \cdot \frac{\sin^2 M\beta}{\sin^2\beta},$$

where $$\alpha = \frac{\pi}{\lambda} b(\sin i - \sin i')\alpha = \frac{\pi}{\lambda} b(\sin i - \sin i'), \beta = \frac{\pi}{\lambda} d(\sin\varphi - \sin\varphi'), i = \varphi - \theta,$$

$$i' = \varphi' + \theta.$$

It can be derived that in case the grating parameters are fixed, when the wavelengths λ are different, the distribution intensities I of the diffraction slits of the grating are different, and images will be formed at different positions.

Figure 3:
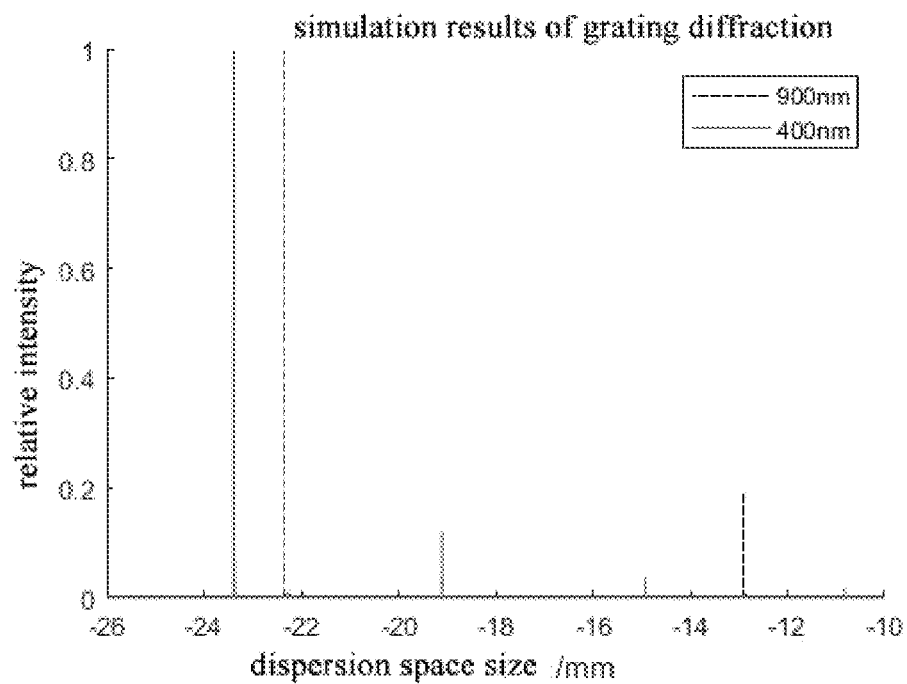
FIG. 3 is a schematic view of a simulation structure of grating diffraction according to a specific embodiment of the present application.

As shown in FIG. 3, it is a diffraction simulation result of a blazed grating with the number of grooves M=600, the blazed angle θ=8.6°, and the grating constant d=10 u. It can be seen that, by utilizing the dispersion property of the grating, different wavelengths λ1 and λ2 are imaged at different positions in an image detector. From the diffraction simulation results of wavelength λ1=400 nm and wavelength λ2=900 nm, it can be seen that in case the grating parameters are fixed, when the wavelengths A are different, the distribution intensities I of the diffraction slits of the grating are different, and images will be formed at different positions. Therefore, the tunable filter 4 tunes light of different wavelengths to form different light spot position distributions. The high-speed spectral output of the tunable filter will also cause the light spot to shift at a high speed. The image recording device of light spot position 7 records time required for the light spot to move from the initial position to the ending position, so as to obtain the spectral response speed of the tunable filter.

A method for testing a spectral response speed of a tunable filter using the above device comprises the following steps:

S1: irradiating the tunable filter with light from the collimating light source;

S2: continuously tuning the tunable filter within a certain wavelength range;

S3: recording a displacement distance of the light spot position in the imaging and recording device during the continuous tuning process; and S4: obtaining the response speed of the tunable filter based on time required for the displacement distance.

In a specific embodiment, when the image recording device of light spot position in the optical path in S4 employs a high-speed camera, the high-speed camera records the displacement distance of the light spot to which the tunable filter corresponds within a certain wavelength range, and the response speed of the tunable filter within a corresponding spectral range is obtained according to the total time to which the displacement distance corresponds. The total time to which the displacement distance corresponds can be calculated according to the time characteristics of sensor of the camera.

Figure 4:
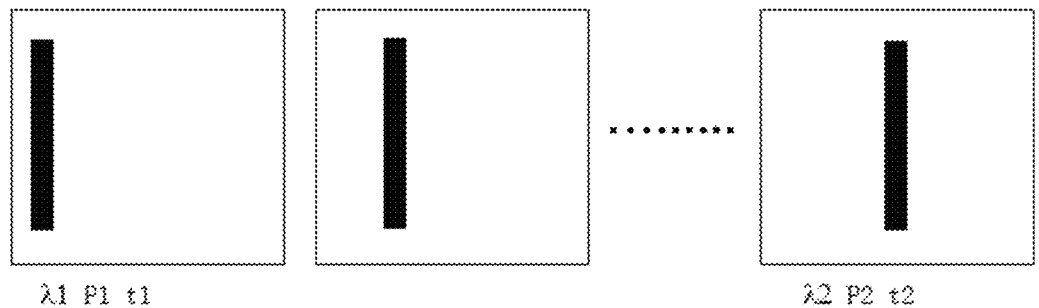
FIG. 4 is a schematic view illustrating imaging of a high-speed camera according to a specific embodiment of the present application.

In a specific embodiment, as shown in FIG. 4, the tunable filter starts at time t1, and the high-speed camera starts to record the light spot position P1 to which the wavelength λ1 corresponds; when the wavelength moves to λ2, the corresponding tunable filter stops at time t2, the high-speed camera records the light spot position P2 to which the wavelength λ2 corresponds. The $F_1$-th frame corresponding to the light spot position P1 and the F2-th frame corresponding to the light spot position P2 are found out through image analysis on the high-speed camera. The speed of the high-speed camera is M frames/sec. A total of F2−F1 frames are captured from the start-up to the stop of the tunable filter, thus the response time from wavelength λ1 to wavelength λ2 is Δt=(F2−F1)/M. The frame rate of a high-speed camera can reach thousands of frames, tens of thousands of frames or even hundreds of thousands of frames per second, which can greatly improve the temporal precision.

Figure 5:
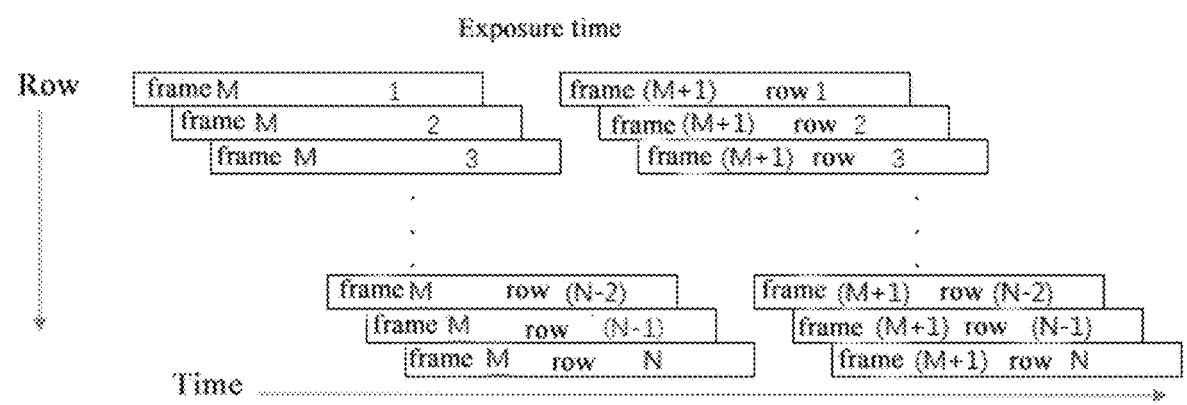
FIG. 5 is a schematic view illustrating an imaging principle of a rolling shutter camera according to a specific embodiment of the present application.

In a specific embodiment, when the image recording device of light spot position in the optical path in S4 employs the CMOS sensor of a rolling shutter camera, each individual row can start exposure of the next frame after readout of the previous frame is finished, so each row in a frame will be exposed for the same amount of time. However, if different rows start exposure at different points in time, overlapping exposures of two frames are allowed. As shown in FIG. 5, the time at which the first row of frame M starts exposure is different from the time at which the second row starts exposure. This situation causes different rows to have different exposure sampling time points, and the effect in the movement of the light spot will generate a distortion. The response time of the tunable filter can be converted into space change for recording according to such a distortion.

Figure 6:
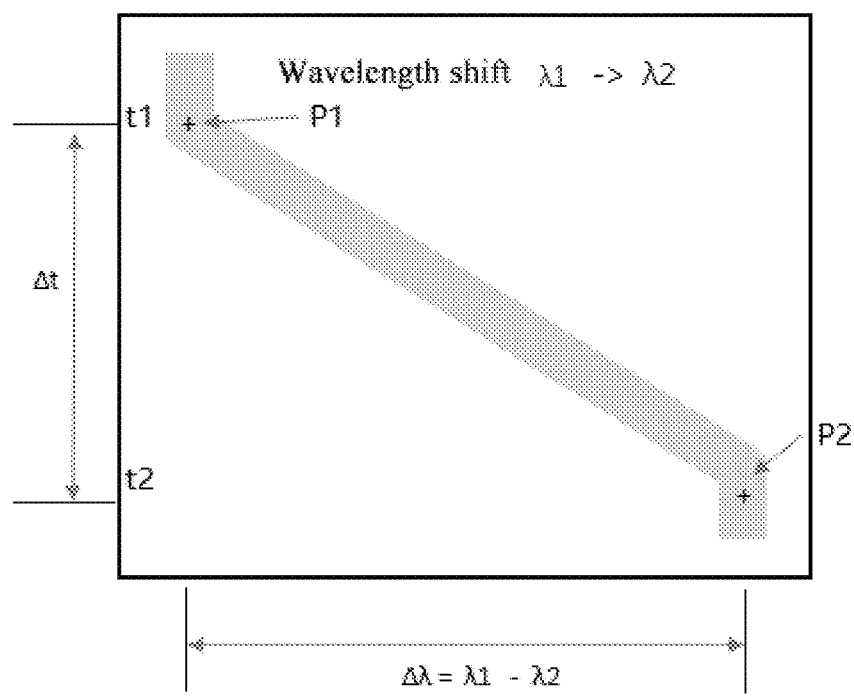
FIG. 6 is a schematic view illustrating imaging of a rolling shutter camera according to a specific embodiment of the present application.

In a specific embodiment, the tunable filter starts at time $t_1$, and the rolling shutter type CMOS sensor starts to record the light spot position $P_1$ to which the wavelength λ1 corresponds; when the wavelength moves to λ2, the corresponding tunable filter stops at time t2, and the rolling shutter type CMOS sensor records the light spot position P2 to which the wavelength λ2 corresponds. As shown in FIG. 6, the wavelength space is represented by the abscissa in FIG. 6, and the sampling time is represented by the ordinate in FIG. 6. The light spot positions P1 and P2 are located in the coordinate system according to the data, and the response time from wavelength λ1 to wavelength λ2 can be converted into Δt.

In a specific embodiment, the measurement time range can be adjusted by changing different driving parameters of the rolling shutter type CMOS sensor. Assuming that the pixel of the rolling shutter type CMOS sensor is W*H, the frame rate is M, the time for a single frame is 1/M, and the progressive exposure time difference is 1/(M*H). For example, for a 1080P 30-frame rolling shutter type CMOS sensor, the progressive exposure time difference is 1/(30*1080)=30 us, which can greatly improve the temporal precision.

Through the system and method of the present application, a diffractive or refractive optical element is used to present the filtering effect in the time dimension of the tunable filter in the space dimension, and an imaging chip or sensor is used to record the spatial positions of different bands. The response speed of the tunable filter in a certain wavelength range can be obtained by means of the time difference to which the spatial position difference corresponds. Moreover, the use of a high-speed camera or a rolling shutter camera can also greatly improve the temporal precision.

Obviously, those skilled in the art can make various modifications and changes to the embodiments of the present application without departing from the spirit and scope of the present application. In this way, if these modifications and changes are within the scope of the claims of the present application and their equivalents, the present application is also intended to encompass these modifications and changes. The word "comprising" does not exclude the presence of other elements or steps not listed in a claim. The mere fact that certain measures are recited in mutually different dependent claims does not indicate that a combination of these measures cannot be used to advantage. Any reference sign in the claims should not be construed as limiting the scope.

The invention claimed is:

1. A system for testing a spectral response speed of a tunable filter, wherein comprising: a collimating light source, a beam splitting element, a focusing lens and an image recording device of light spot position arranged successively, the tunable filter being disposed between the collimating light source and the beam splitting element and configured to be continuously tuned within a certain wavelength range during testing, the beam splitting element being used to transform light beams of different wavelength bands passing through the tunable filter into diffracted beams or refracted beams corresponding to different wavelength bands, the focusing lens being used to focus the diffracted beams or refracted beams to be incident on the image recording device of light spot position, and the image recording device of light spot position being used to record change information about positions where the diffracted beams or refracted beams corresponding to different wavelength bands are imaged,
   wherein the beam splitting element employs a diffraction grating or a refractive prism and the light spot image recording device employs a high-speed camera or a rolling shutter camera.

2. The system for testing a spectral response speed of a tunable filter according to claim 1, wherein the collimating light source comprises a light emitting source, a slit and a collimating lens arranged successively.

3. A method for testing a spectral response speed of a tunable filter, wherein using the system according to claims 1, and comprising the following steps:
   S1: irradiating the tunable filter with light from the collimating light source;
   S2: continuously tuning the tunable filter within a certain wavelength range;
   S3: record a displacement distance of a light spot position in the image recording device during the continuous tuning process; and
   S4: obtaining a response speed of the tunable filter based on time required for the displacement distance.

4. The method for testing a spectral response speed of a tunable filter according to claim 3, wherein in the case that the image recording device of light spot position comprises the high-speed camera, step S4 further comprises: recording a light spot position image corresponding to a light spot position P1 as an F1-th frame, and a light spot position image corresponding to a light spot position P2 as an F2-th frame, thus response time from a wavelength 3 to a wavelength A2 is $\Delta t=(F2-F1)/M$, where M is a frame rate of the image recording device of light spot position.

5. The method for testing a spectral response speed of a tunable filter according to claim 3, wherein in the case that the light spot image recording device comprises a the rolling shutter camera, step S4 further comprises: firstly establishing a coordinate system in which an abscissa represents a wavelength, and a ordinate represents time; locating information of the light spot positions P1 and P2 within the coordinate system according to a vision algorithm, then converting response time At from a wavelength 11 to a wavelength A2.

* * * * *